United States Patent [19]

Firth

[11] Patent Number: 4,516,674

[45] Date of Patent: May 14, 1985

[54] METHOD AND APPARATUS FOR CONVEYING AND METERING SOLID MATERIAL

[76] Inventor: Donald Firth, 2277 Mandeville Canyon, Los Angeles, Calif. 90049

[21] Appl. No.: 649,736

[22] Filed: Sep. 12, 1984

Related U.S. Application Data

[63] Continuation of Ser. No. 284,560, Jul. 20, 1981, abandoned.

[51] Int. Cl.³ .................................................. B65G 31/04
[52] U.S. Cl. ........................................ 198/617; 100/48; 100/156; 100/177; 198/639; 198/642; 198/718; 198/723; 415/90; 415/126
[58] Field of Search .................. 406/52, 71, 99; 198/642, 723, 617, 639, 718; 415/90, 126, 127, 148, 150; 222/311–313, 410, 414; 100/48, 156, 177

[56] References Cited

U.S. PATENT DOCUMENTS

| | | | |
|---|---|---|---|
| 2,045,081 | 6/1936 | Hart | 198/723 |
| 2,196,390 | 4/1940 | Gates | 198/723 |
| 2,568,536 | 9/1951 | Beech | 198/723 |
| 2,843,047 | 7/1958 | Korber | 415/90 |
| 3,765,216 | 10/1973 | Green | 72/262 |
| 3,889,588 | 6/1975 | Wollersheim | 100/177 |

FOREIGN PATENT DOCUMENTS

80/00472  3/1980  PCT Int'l Appl. ................ 406/99

Primary Examiner—Jeffrey V. Nase

[57] ABSTRACT

A solid material pump or conveyance apparatus and method including a pump housing an inlet and an outlet with a passageway between them. The passageway is formed and defined by a friction drive wall which is movable relative the pump housing towards the outlet and a wall stationary relative the pump housing. The friction drive wall has a greater surface area for contacting the solid material than the stationary wall. The friction drive wall exerts frictional forces upon the solids material introduced through the housing inlet which exceed the frictional drag exerted upon the material by the stationary wall, so that the net frictional force drives the material in a forward direction toward the housing outlet. The solid material is compacted or compressed prior to or upon entry into the pumping apparatus to a sufficient level so that the solid material exhibits some of the properties of a liquid. Due to the semi-hydrostatic behavior of the solid material, the frictional forces exerted by the drive wall conveys the entire mass of material through the passageway. This provides a convenient method and apparatus for conveying solid materials which is non-jamming. Additionally, since there is little or no slippage between the friction drive wall and the semi-hydrostatic solid mass, the amount of solid material flowing through the passageway may be metered according to conventional techniques.

5 Claims, 7 Drawing Figures

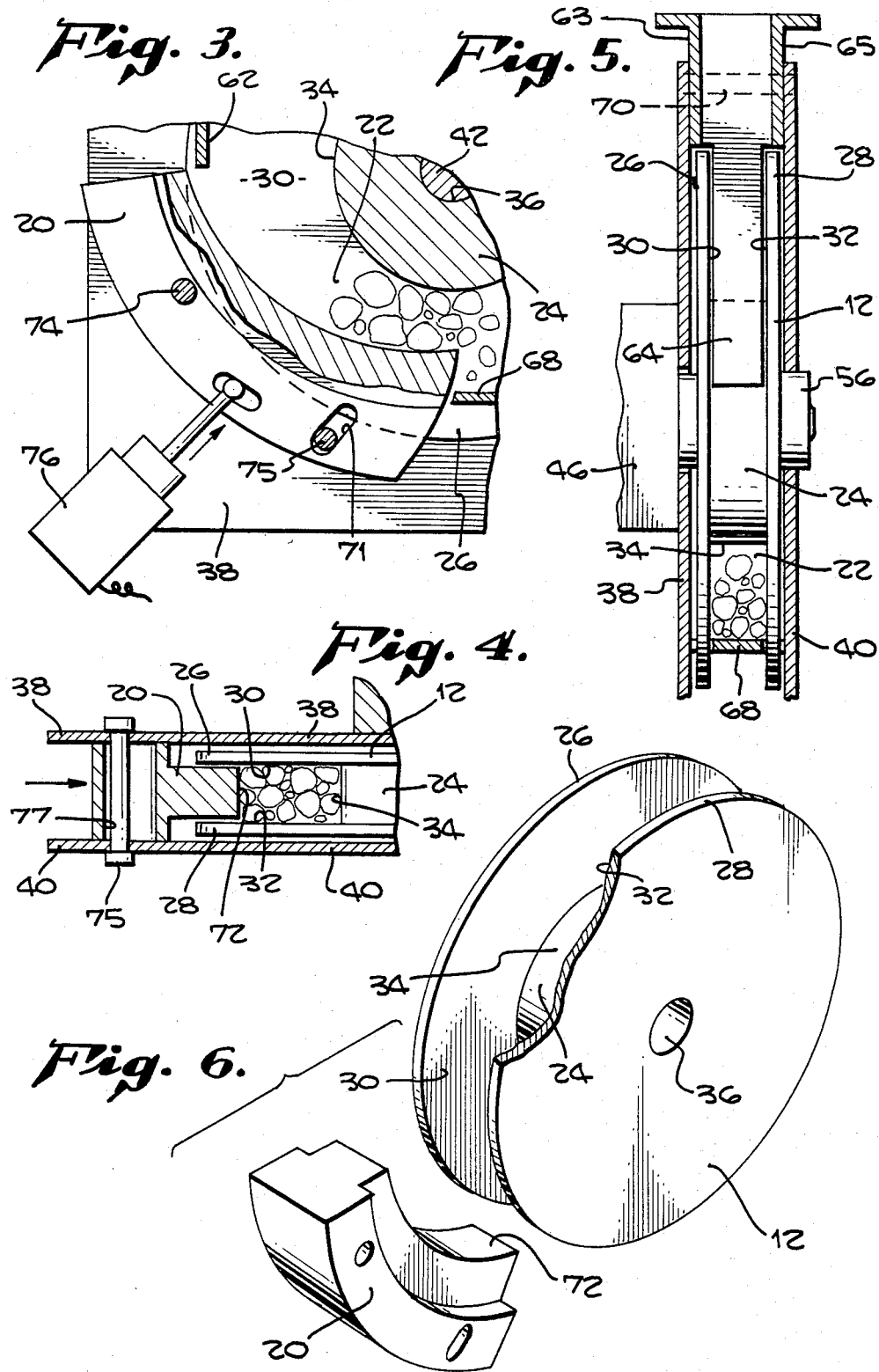

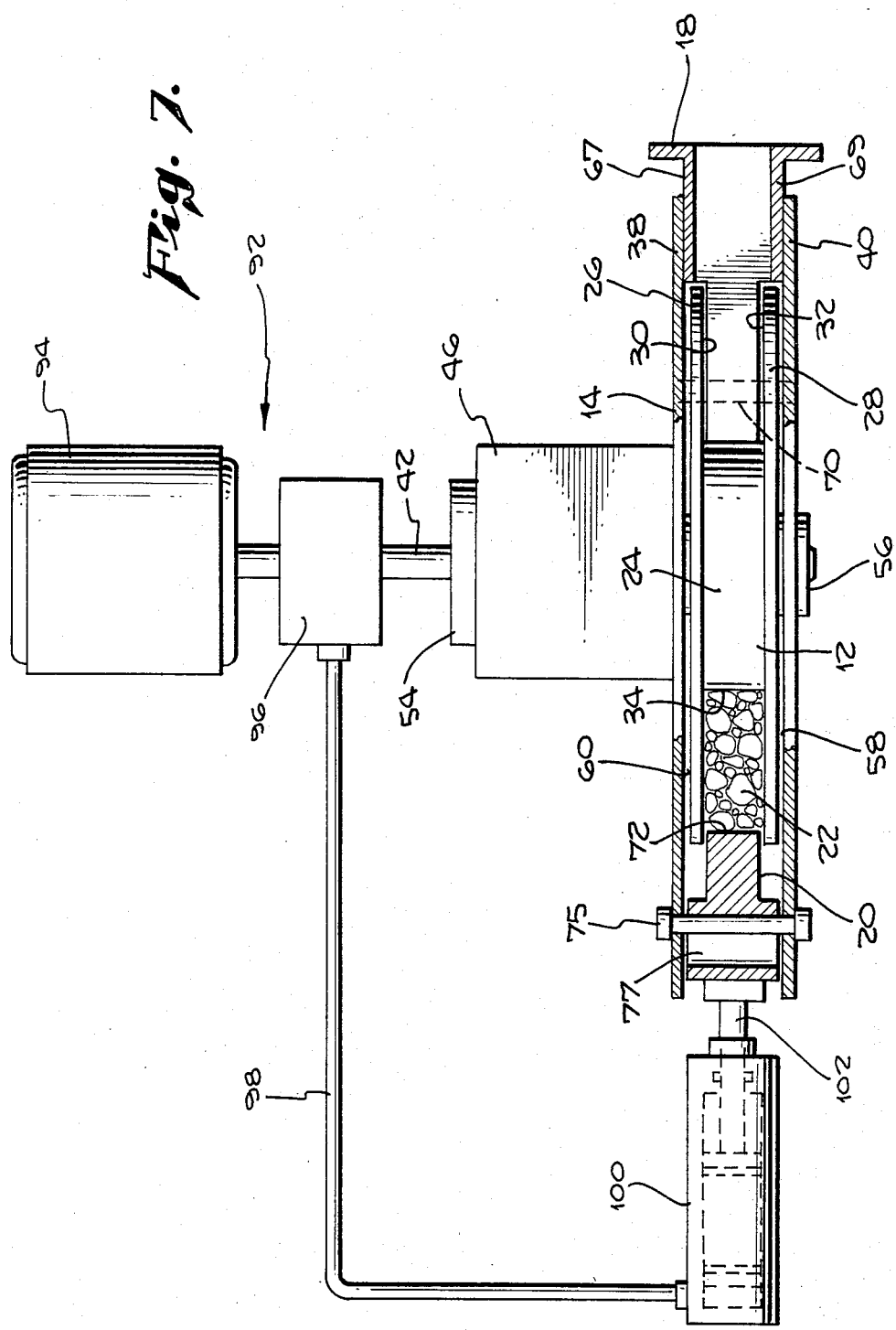

METHOD AND APPARATUS FOR CONVEYING AND METERING SOLID MATERIAL

This is a continuation of application Ser. No. 284,560, filed July 20, 1981, now abandoned.

BACKGROUND OF THE INVENTION

The present invention relates generally to apparatus and methods for conveying particulate solid material in large scale industrial processes.

The present invention has particular application to large scale industrial processes for the treatment of coal, oil shale or the like where large amounts of solid material must be conveyed and metered to different processing apparatus and areas within a particular processing plant.

Presently, screw feeders are typically utilized throughout large scale industrial operations for transporting and metering solid materials. For example, in the processing of oil shale and coal, screw feeders are often specified as the means for introducing the raw carbonaceous material into processing apparatus. Although conventional screw feeders are widely used in industry, they are notorious for problems resulting from jamming due to material wedging between the outside of the screw flights and the trough or enclosure within which the screw rotates. As material begins to wedge and jam within the typical screw feeder, continued rotation of the screw increases pressure and compaction of the material at the stoppage site until a highly compacted plug is formed. The screw feeder continues to turn until the compressed plug or massive material becomes so large that the power or torque capabilities of the driving motor is exceeded. At this point, the only means by which the plug can be removed from the typical screw feeder is to disassemble and remove the screw from its enclosure.

In order to prevent severe jamming in screw type feeders, shear pins have been inserted in the screw feed drive system to prevent excessive loading and jamming of the screw feed conveyor. These pins are designed to shear prior to excessive screw loading to prevent severe compacting and plugging of the screw feeder trough or enclosure. In this way, clean-out of the screw feed conveyor is made easier since severe compaction and plugging of the conveyor tube is eliminated due to shearing of the pin prior to development of excessive torque loading on the screw. Even so, the screw feeders are still prone to jamming and must be cleaned out every time a shear pin is broken. In addition, shear pins which are continually stressed and strained during operation of the screw feed conveyor are subject to premature failure at loads normally encountered during conveyance of the solid materials.

The intermittent breakdown of screw feeders due to jamming and other system failures, is not only time-consuming but is quite costly due to the shutdown of an entire processing plant resulting from such a conveyance system failure. Accordingly, it is apparent that there is a present need for a non-jamming method and apparatus for conveying and metering solid materials.

SUMMARY OF THE INVENTION

In accordance with the present invention, an improved apparatus and method is provided for conveying and metering solids and especially particulate solids with decreased jamming of the apparatus. The present invention is based on a new conveyor apparatus or pump which includes a pump housing having an inlet, an outlet and a passageway between the inlet and outlet. The passageway is formed between a friction drivewall which is movable relative the pump housing towards the outlet and a wall stationary relative the pump housing. An important feature of the present invention is that the friction drivewall has a greater surface area for contacting the solid material than the stationary wall. In this way, the friction drive wall exerts frictional forces upon the solid material introduced through the housing inlet which exceed the frictional drag exerted upon the material by the stationary wall, so that the net frictional force drives the material in a forward direction toward the outlet.

As another feature of the present invention, the solid material is compacted or compressed prior to or upon entry into the pumping apparatus to a sufficient level so that the solid material exhibits some of the properties of a liquid. As a result, the solid material becomes semi-hydrostatic in nature so that the frictional forces exerted by the drivewall conveys the entire mass of material through the passageway and additionally since there is little or no slippage between the friction drivewall and semi-hydrostatic solid mass, the amount of solid material flowing through the passageway may be metered according to conventional techniques.

The method and apparatus of the present invention is believed to be essentially non-jamming, since it does away with the cross-cutting or cross-current blade action of a screw feeder. For example, in a screw feeder, as the amount of blockage increases, the amount of frictional force contrary to the flow of solid material is developed. In the present invention, as blockage begins to occur, frictional forces increase as in a screw feeder system; however, the increase in frictional force merely increases the drive force supplied by the friction drivewall resulting in the increase of forces applied to move the solid plug through the passageway. Of course, in severe cases blockage may be great enough so that the torque or power capabilities of the motor driving the friction drivewall will be exceeded. As a particular feature of the present invention, in situations where blockage does occur, instead of having to disassemble the entire pump apparatus, provision is made for moving the stationary wall laterally relative the friction drivewall to increase the cross-sectional area of the passageway so that the plug of material jamming the pump may be easily removed.

The present invention therefore provides a suitable apparatus and method for conveying solid material which is non-jamming since the driving wall moves in the same direction as the flow of material as opposed to conventional screw feed apparatus having blades which continually cross cut the flow of material. Further, compaction of the solid material through the pump prevents any blow by of gas or product material which may be lost during introduction of carbonaceous material into a preheat or retort system.

The above-discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 3 is a partial view of the preferred pump in accordance with the present invention showing the adjustable passageway shoe moved to its inward or high compaction position.

FIG. 4 is a partial view similar to FIG. 2 showing the pump in the high compaction position.

FIG. 5 is a vertical section taken in the V—V plane of FIG. 1.

FIG. 6 is an exploded perspective view of the rotor disc and adjustable passageway shoe.

FIG. 7 is an alternative adjustable shoe embodiment.

DETAILED DESCRIPTION OF A PREFERRED EXEMPLARY EMBODIMENT

Figure 1:
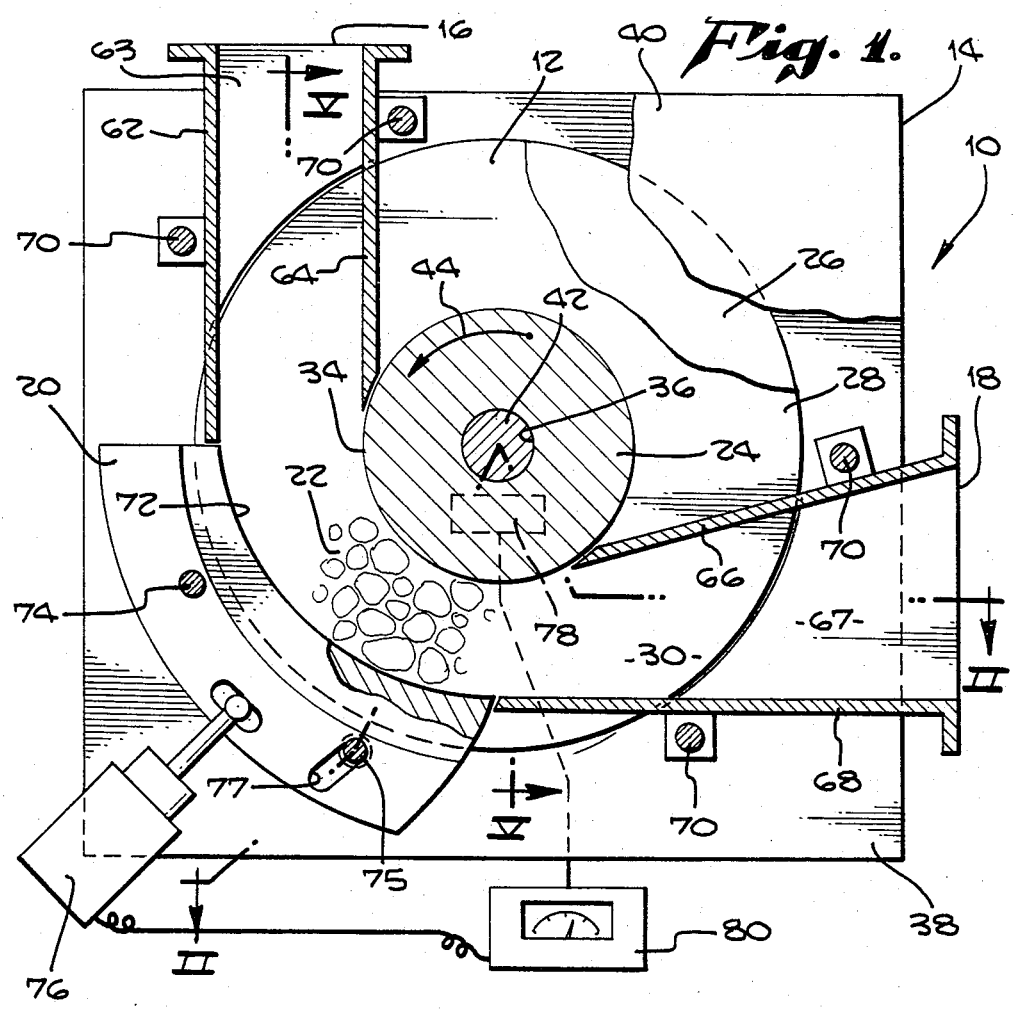
FIG. 1 is a partial cross-sectional side view of a preferred solids pump in accordance with the present invention. The view is taken in the I—I plane of FIG. 2.
Figure 2:
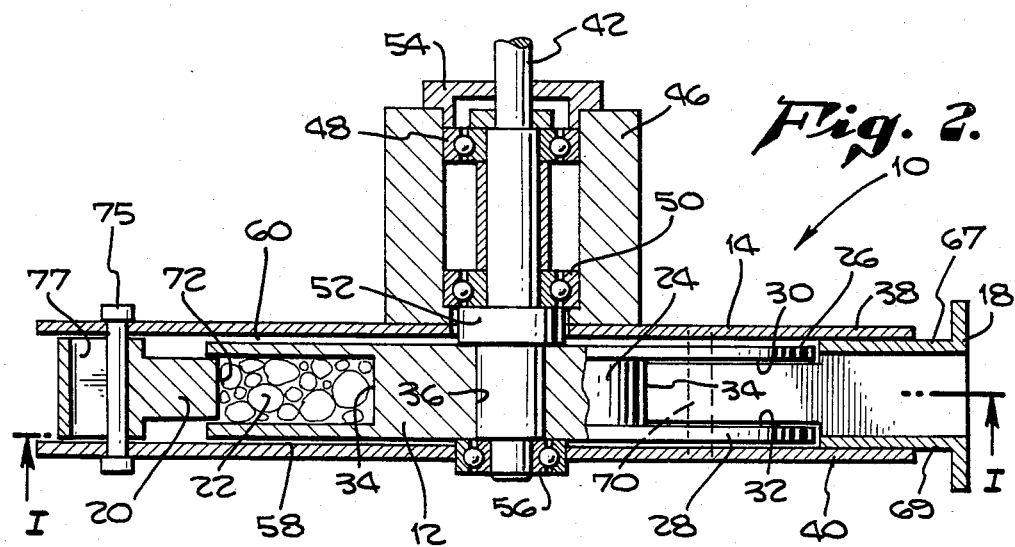
FIG. 2 is a sectional view of FIG. 1 taken in the II—II plane.

A preferred pump in accordance with the present invention is shown generally at 10 in FIGS. 1 and 2. The pump is designed for conveying solid materials, such as sand, oil shale, coal, and any other particulate solid material. The pump includes basically a friction drive rotor 12 which is mounted within housing 14, inlet 16, outlet 18, and an adjustable shoe 20. In operation, solids are introduced by gravity feed or other positive pressure means through inlet 16 into passageway 22 between the friction drive rotor 12 and adjustable shoe member 20. The friction drive rotor 12 drives the solids through passageway 22 and into outlet 18 and out of the pump 10. Having basically described the pump and its operation, a more detailed description of this preferred exemplary embodiment follows.

Referring to FIG. 6, a preferred friction drive rotor 12 is shown. The friction drive rotor 12 includes a hub portion 24 and two sidewalls 26 and 28 extending radially outward from the hub portion 24. The interior faces 30 and 32 of sidewalls 26 and 28, along with the exterior face 34 of hub portion 24 provide friction drive walls or faces which contact the solid material as the rotor 12 is rotated to drive the solids through the pump 10. The hub portion 24 is further provided with a hole 36 for mounting the drive rotor 10 to a suitable shaft. Preferrably, the drive rotor 12 is made from a suitably tough material such as iron or steel. The drive rotor may be made from one integral piece of material or may be fabricated as desired.

Referring to FIGS. 1 and 2, the drive rotor 12 is mounted within housing 14. The housing 14 includes walls 38 and 40. The drive rotor 12 is mounted in between walls 38 and 40 by way of shaft 42. The shaft 42 is driven by a conventional motor or gasoline engine (not shown) in the direction indicated by arrow 44. The shaft is mounted within bearing housing 46 which includes bearings 48 and 50. The bearings are sealed off from the housing by seal 52 and are also sealed externally by seal 54. Further, the shaft 42 is journaled within sealed bearing 56 which is mounted securely within housing wall 40. The drive rotor 12 is securely mounted to shaft 42 so that they rotate in unison only.

It is preferred that the drive rotor 12 and housing 14 be sized so that the gaps 58 and 60 between the drive rotor 12 and housing walls 38 and 40 be kept at a minimum.

The inlet 16 includes walls 62, 63, 64, and 65. The walls 62 and 64 are sized so that they fit between the sidewalls 26 and 28 of the drive rotor 12. The walls 63 and 65 terminate on their inner ends along the perimeter of drive rotor 10 as best shown in FIG. 5. Preferrably, gaps between the inlet walls 62 and 64 and drive rotor walls 26 and 28 and between walls 63 and 65 and the drive rotor 10 perimeter are kept at a minimum to prevent solids from leaking out of the pump 10 while at the same time not being so close that binding occurs between the inlet walls and drive rotor.

The outlet 18 includes walls 66 and 68 which are sized to fit within the U-channel defined by drive rotor 12 and walls 67 and 69 which terminate on their inner ends along the perimeter of drive rotor 10 as shown in FIG. 2. Again, it is desirable that the outlet walls 66 and 68 be sufficiently wide so that they prevent solids from falling through gaps between the outlet walls 66 and 68 and the drive rotor walls 26 and 28 while not being so wide as to bind against the drive rotor 12. Also, the gap between the walls 67 and 69 and the drive rotor 10 perimeter should be kept at a minimum to prevent leakage of solids materials.

Both inlet 16 and outlet 18 are secured to the housing by suitable means such as bolts or pins 70. The bolts 70 are additionally used for securing the housing sidewalls 38 and 40 in position; however, any suitable means may be used for fixing the position of the housing walls 38 and 40 securely relative each other.

As shown in FIG. 1, the inlet wall 64 and outlet wall 66 each terminate on their inner ends adjacent the exterior face 34 of hub portion 24. The inlet wall 62 and outlet wall 68 terminate on their inner end adjacent the adjustable shoe 20. In this way, a passageway 22 is defined by a portion of the friction drive rotor 12 and the interior face 72 of adjustable shoe 20.

As an important aspect of the present invention, the surface area of the shoe interior face 72 is less than the surface areas of the interior sidewall faces 30 and 32 and exterior face of hub portion 34 which are located at any given time in passageway 22 between inlet 16 and outlet 18 as the drive rotor 10 is rotated. In accordance with the present invention, since the surface area of the driving walls is greater than that of the stationary shoe wall, the net resulting frictional drive force conveys the particulate solids through the passageway 22.

Since it is particularly contemplated that particulate solids will be conveyed through the pump 10, it is important that the particulate solids be compacted to differing degrees for conveyance by friction through the passageway 22. Specifically, if the solids are not compacted to any degree, the frictional drive force exerted on the particles adjacent the friction drive walls will not be conveyed to the bulk of the particles thereby resulting in little or no friction drive or conveyance of the solid material. In accordance with the present invention, the solid materials are compacted either prior to or within the passageway 22. Compaction of the solids results in the solid material taking on a semi-hydrostatic character so that frictional forces exerted by the friction drive walls and stationary interior shoe face are distributed throughout the entire particulate solids within the passageway resulting in conveyance of the entire solid mass.

The amount of compaction necessary for preferred operation of the solids pump 10 in accordance with the present invention will vary greatly depending upon the particular material being conveyed. For many solids, the pressure head developed by gravitational forces exerted on particulate solids in inlet 16 would result in sufficient compaction for operation of the pump. In this type of situation, no additional compaction would be necessary and a completely stationary fixed non-adjustable shoe would be sufficient for pump action.

However, it is preferred that the amount of compaction obtainable within passageway 22 be variable. To accomplish such variable compaction, shoe 20 is mounted within housing 14 by pivot bar 74. The pivot bar 74 fixes the location of the upper end of shoe 20 adjacent the inlet wall 62 while allowing pivoting of the lower end of the shoe 20 inward toward the drive rotor hub portion 24 as restricted by pin 75 and slot 77. In FIGS. 1 and 2, the shoe is shown in its fully withdrawn position where the interior face 72 of the shoe forms a continuous arc between inlet wall 62 and outlet wall 68. In FIGS. 3, 4, and 5, the shoe 20 is shown in its fully inserted position where the cross-sectional area of passageway 22 is maximally reduced. In this way, it is possible to provide a passageway 22 having cross-sectional areas which decrease from the inlet end to the outlet end resulting in compaction of solids material as it moves therethrough. In practice, the pump will initially be operated with the adjustable shoe 20 in its fully retracted position as shown in FIG. 1. If sufficient compaction of solid material is available in this position, to provide adequate conveyance of the solid material, the shoe will remain in its fully retracted position. Usually, however, compaction of the solid material within the passageway will be necessary in order to provide sufficient frictional forces to convey the solids out through outlet 18. Accordingly, the adjustable shoe 20 will be moved inward somewhere between the position shown in FIG. 1 and the position shown in FIG. 3 to provide the necessary compaction for adequate conveyance of the solid material.

Movement of the adjustable shoe inward and outward to adjust cross-sectional areas of passageway 22 may be accomplished in any number of ways. As shown in FIG. 1, it is preferred that an electric servo motor 76 or suitable equivalent be provided to adjustably move the shoe 20 towards and away from the drive rotor 12. In one feature of the present invention, it is preferred that the amount of torque load or resistance experienced by the drive rotor 12 be monitored by a suitable torque or rotation monitor 78. In operation a metered servo switch 80 is provided which moves the adjustable shoe inward until torque loads increase thereby to increasing the frictional drive forces between the rotor and the solids resulting in an increase in the forward driving force towards outlet 18. The adjustable shoe 20 continues to move inward until a predetermined torque is reached, indicating sufficient compaction of the solid material to provide maximum conveying efficiency. The automatic adjustment system is designed so that once the torque load of the motor or engine is exceeded or the drive rotor slows the servo switch 80 will cause the servo motor 76 to retract the adjustable shoe 20 to thereby increase the cross-sectional area of passageway 22 to allow the solid material to more freely travel through the pump. Although this type of automatic self-regulating system is preferred, the present invention may also be carried out with the adjustable shoe 20 being moved manually between fixed positions if desired.

Another embodiment in accordance with the present invention for continually adjusting the shoe 20 is shown in FIG. 7. This particular embodiment utilizes a hydrostatic drive unit 92 which is designed to apply constant torque to shaft 42. The hydrostatic drive unit 92 includes a drive motor or engine 94 and a hydrostatic transmission or drive assembly 96. The hydrostatic transmission 96 is of conventional type wherein constant torque is applied to shaft 42 by varying the pressure of the hydraulic medium present within the transmission 96. For example, when the rotor experiences increased pump loads, the hydraulic medium pressure will be lowered in hydrostatic transmission 96 in order to maintain constant torque to shaft 42. Conversely, when lower loads are being driven by the rotor 12, the hydraulic medium pressure is increased to higher levels. As a particular feature of this embodiment, a hydraulic fluid line 98 is connected between the hydrostatic transmission 96 and a hydraulic cylinder 100. The hydraulic cylinder drives piston 102 against the adjustable shoe 20. In this manner, constant pressure is exerted on shoe 20. The amount of pressure will vary according to the torque load experienced by rotor 12. More particularly, as torque loads on the rotor increase, the hydraulic medium pressure will decrease in hydrostatic transmission 96 to provide constant torque to shaft 42. Concurrently, the pressure of the hydraulic medium in cylinder 100 will also decrease proportionally thereby decreasing the force exerted on the solids material and allowing easier pumping of the solid material through the pump. Conversely, when easily pumped solids pass through the pump, the pressure in the hydrostatic transmission 96 will increase thereby increasing the pressure of the hydraulic medium in cylinder 100 resulting in increased pressure exerted on adjustable shoe 20. As will be realized, by choosing suitable hydrostatic pressures utilizing suitable valves etc., a particularly useful pump may be produced wherein the pressure applied to the adjustable shoe is self-compensating and operates continually in response to loads experienced by shaft 42.

Although as shown in the preferred embodiment, compaction solids takes place within passageway 22, compaction may also be accomplished by sloping the walls of inlet 16 inward as they approach passageway 22. In this way, a certain amount of compaction will take place which may be all that is necessary for suitable conveyance of certain solids.

As can be seen, the present pump is an improvement over prior screw-type feeders which continually must cut through the solid material and carry it in a direction opposed by frictional forces generated by the screw blades. The present invention, by compacting the solids sufficiently and introducing it into a passageway where the surface area of the friction driving walls is larger than that of a stationary wall, results in forces being generated on the particulate material for the most part only in the direction of travel of the solids. The pump, therefore, is less likely to plug and when it does, the plug may easily be removed by increasing the cross-section of the passageway through which the material passes.

Since there will be very little if any slippage between the driving wall and the solid materials conveyed through passageway 22, the pump of the present invention may also be used as a meter to measure the amount of solids conveyed through the pump. Since the volume of the passageway is known, conventional techniques involving measurements of the drive rotor rotational speed can easily be used to determine the flow rate of solids material through the pump.

Having thus described exemplary embodiments of the present invention, it should be noted by those skilled in the art that the within disclosures are exemplary only and that various other alternatives, adaptations, and modifications may be made within the scope of the present invention. For example, although a drive rotor is the preferred form of driving wall, it is not essential. Any type of conveyor belt or other system may be utilized so long as the requisite compaction and ratio of driving wall area to stationary wall area is present. Accordingly, the present invention is not limited to the specific embodiments as illustrated herein.

What is claimed is:

1. An apparatus for conveying solid material comprising:
    a pump housing having an inlet, an outlet and a passageway between said inlet and outlet, said passageway being formed between a friction drive wall movable relative to said pump housing from said inlet towards said outlet and a stationary wall fixed relative said pump housing, said friction drive wall having a greater surface area for contacting said solid material than said stationary wall, said passageway being free of blades and other protuberances from said friction drive wall and said stationary wall;
    means for compacting solid material after introduction into said inlet, said compacting means including a convergence of said friction drive wall and said stationary wall to provide a passageway having cross-sectional areas which decrease from said inlet to said outlet;
    motive means for driving said friction drive wall from said inlet to said outlet; and
    means for adjusting the position of said stationary wall with respect to the position of said friction drive wall to vary the amount of compaction of said solids in said passageway, such adjusting means cooperating with said motive means to adjust the compaction of said solids in response to torque loads upon said motive means.

2. An apparatus according to claim 1 wherein said friction drive wall is provided by the outer edge of a rotor disc which is rotatable within said pump housing.

3. An apparatus according to claim 2 wherein the outer edge of said rotor disc includes a U-shaped groove having interior faces forming said friction drive wall.

4. An apparatus according to claim 3 wherein said rotor disc is fixed laterally relative said pump housing and said stationary wall is movable laterally relative said rotor disc to vary the cross-sectional areas of said passageway.

5. A process for conveying solid material comprising the steps of:
    feeding solid material to an inlet end of a passageway formed between a friction drive wall and a stationary wall, said friction drive wall having a greater surface area for contacting said solid material than said stationary wall;
    moving said friction drive wall towards an outlet end of said passageway;
    monitoring the torque needed to move said friction drive wall;
    compacting said solid material within said passageway by converging said stationary drive wall with respect to said friction drive wall; and
    varying the degree of convergence of said stationary wall with respect to said friction drive wall in response to changes in said torque.

* * * * *